Patented Nov. 12, 1929

1,734,987

UNITED STATES PATENT OFFICE

BAILEY F. WILLIAMSON AND WALTER H. BEISLER, OF GAINESVILLE, FLORIDA

PROCESS FOR MAKING ESTER GUM

No Drawing. Application filed May 23, 1927, Serial No. 193,719. Renewed September 13, 1929.

This invention relates to an improved process for making ester gum, such as is extensively used in the manufacture of varnish and paints.

The ordinary method of making ester gum consists substantially in heating together rosin with about 10% of glycerine, and often with the addition of lime, to a temperature of 280° C. The rosin which is used in the preparation of ester gum is prepared in turpentine camps from gum theus, which exudes from pine trees and is caught in cups hanging on the trees. The crude theus, which always contains more or less foreign matter such as water, chips and other trash, as well as oleo-resin, is poured into a still which is heated with direct heat. Such heating causes the turpentine content of the gum theus to be distilled off and permits the rosin to be drawn off from the bottom of the still, after which it is passed through metal strainers and cotton batting, to strain out foreign matter.

This method of producing rosin causes partial decomposition thereof, and therefore results in an inferior product. After the rosin is strained, it is poured into barrels in which it is allowed to cool and harden so that it may be shipped to markets. This shipping ordinarily entails much handling and frequent losses of considerable quantities of rosin, which, of course, adds greatly to the cost of the product as well as to the cost of varnish or other products which are made from the rosin.

The manufacturer who produces ester gum purchases rosin, such as is prepared by the method outlined above, on the market. He then combines it with about 10%–20% of glycerine, as above stated, by heating the rosin and glycerine to a relatively high temperature, which tends to further decompose the rosin, whereby the quality of the ester gum is impaired. Each heating of the rosin causes decomposition thereof and effects a darkening of the color of the rosin. Such decomposition produces a quantity of unsaponifiable matter, which is very sticky and particularly objectionable in such products as paint and varnish.

The principal object of the present invention is to overcome some of the objections to the method outlined above and to produce an ester gum of higher quality and lighter color than has heretofore been obtainable. Another object is to provide a method or process for making ester gum from gum theus in a single step or operation, and still another object is to provide a process which will produce a product of higher quality at a considerably lower cost than is possible under the old method. A further object of the invention is to produce ester gum which is practically free from the sticky, unsaponifiable matter which is a decomposition product.

Other objects and advantages of the invention will become apparent by reference to the following specification, wherein we have described our improved process.

In carrying out our new process, we first heat the crude gum theus sufficiently to permit straining the same so as to remove foreign matter such as chips and other trash. The strained or cleaned gum theus is then poured into a still, together with a quantity of glycerine, where it is gradually heated to a temperature sufficient to drive off the water and part of the turpentine which is present in the gum theus. The temperature is thereafter increased and a moderate flow of steam is bubbled through the mixture in the still, during which period the remaining turpentine and other miscellaneous light or volatile oils are driven off.

The flow of steam is thereafter stopped and the contents of the still heated to a further increased temperature for a period sufficient to insure practically complete combination of the rosin content of the gum theus and the glycerine.

During the above described operations, the still is equipped with a reflux condenser so that the mixture in the still may be heated to a relatively high temperature so as to drive off the water, turpentine and other miscellaneous light or volatile oils, without at the same time driving off much of the glycerine. The relatively high boiling point, 290° C., of glycerine, makes the use of a reflux condenser feasible for the purpose of returning to the still such glycerine as may be otherwise driven off.

When the mixture has been heated as above described, the reflux condenser is removed and a rapid flow of steam passed through the contents of the still, and the same maintained at a relatively high degree of temperature for a period of about ten to fifteen minutes, or until the excess of glycerine has been driven off. The fire under the still is then drawn, but the passage of steam through the mixture is continued until the temperature is reduced sufficiently to facilitate straining of the remaining content of the still, which is ester gum, through wire gauze and cotton batting to remove any small particles of solid matter which may remain.

The process above described results in a product, ester gum, which is very light in color and practically free from the sticky, unsaponifiable matter which is always present in the ester gum prepared by the usual method outlined above. The unsaponifiable matter is a decomposition product which is not present in the original gum theus and is not formed by the present process. The passage of steam, which is a non-oxidizing gas, through the mixture in the still serves to agitate the mixture and thereby prevents local over-heating, and also replaces the air in the still above the surface of the mixture, which air would have an active oxidizing effect on the mixture with which it would be in contact if permitted to remain. The passage of steam, which is a form of moisture, also serves to hasten the chemical action, since such action is more readily effected when moisture is present. A substantial saving in time is thus effected.

The present process is further advantageous in that it facilitates the removal of the turpentine and other oils normaly present in the gum theus, since the rosin content of the theus combines quite readily with the glycerine and, incidentally, readily releases practically all of the turpentine and other oils which do not combine with the glycerine. We have found that it is unnecesary to use a catalyst for the purpose of promoting the combination of the rosin and glycerine, since the rosin, when in its virgin form of gum theus, combines very readily with the glycerine, and this fact tends to the production of ester gum of a superior quality, since the catalysts which are ordinarily used are objectionable in that they tend to darken the color of the product and also possibly to increase the amount of unsaponifiable matter.

A suitable formula for making ester gum according to the above described process is as follows:

Mix 100 parts of strained gum theus and 12½ parts of glycerine (10% to 20% based on the rosin content of the gum theus) in a still equipped with a reflux condenser, and heat gradually to a temperature of about 170° C. Continue the heating and pass steam through the mixture until the temperature reaches approximately 240° C., and then shut off the steam and increase the temperature to 290° C. Maintain the mixture at this temperature until the rosin and glycerine are practically completely combined (about 1½ hours). At this point, the reflux condenser should be removed and a rapid flow of steam passed through the mixture while the later is heated at from 275° C. to 290° C. for a period of about ten to fifteen minutes, for the purpose of driving off the excess of glycerine. The passage of steam should then be continued, but the temperature lowered to approximately 200° C. to 220° C., when the contents of the still should be drained therefrom and strained, preparatory to packaging in accordance with the usual practice.

We are aware that changes may be made in the formula and method specified above, without departing from the spirit of the invention, the scope of which should be determined by reference to the following claims, which should be construed as broadly as possible, consistent with the state of the art.

We claim as our invention:

1. The improvement in the process of making ester gum which consists in heating together gum theus and glycerine.

2. The improvement in the art of making ester gum which consists in heating a mixture of gum theus and glycerine to drive off undesired volatile substances and to combine the glycerine with the rosin content of the gum theus.

3. The process of making ester gum by combining the rosin content of gum theus with glycerine, which process consists in heating together such gum theus and glycerine in a still at a relatively low temperature to drive off the water and part of the turpentine content of the still, and continuing the heating at a higher temperature to distill off the remaining turpentine content of the gum theus, said heating being incidentally effective to combine said rosin content and glycerine.

4. The process of making ester gum which consists in heating together gum theus and glycerine in a still to a temperature of about 170° C. until the water and part of the turpentine are distilled off, continuing the heating to 240° C. until the remaining turpentine is distilled off, continuing the heating to 290° C. and maintaining that temperature for a period sufficient to insure the combination of rosin content of the gum theus and the glycerine and to drive off other miscellaneous light or volatile oil constituents of the gum theus.

5. The process of making ester gum which consists of combining the rosin content of gum theus with glycerine by heating the same together to a temperature of about 170° C. in a still equipped with a reflux condenser, whereby the water and part of the turpentine content of the gum theus are distilled off, continuing the heating to about 240° C., and bubbling steam through the mixture so as to remove the remaining turpentine and other miscellaneous light oils from the mixture, stopping the flow of steam but continuing the heating to 290° C. and maintaining that temperature for a period sufficient to insure combination of the rosin content of the gum theus and the glycerine, removing the reflux condenser and again bubbling a flow of steam through the mixture and heating the same at from 275° C. to 290° C. for a period sufficient to remove any surplus quantity of glycerine, and then discontinuing the heating but continuing the flow of steam through the mixture until the temperature is reduced to about 200° C. to 220° C.

6. The process of making ester gum which consists of mixing together substantially 100 parts of gum theus and 12½ parts of glycerine, heating the mixture gradually to a temperature of about 170° C., raising the temperature to about 240° C. while passing steam through the mixture, stopping the flow of steam and raising the temperature to about 290° C. and maintaining that temperature for about 1½ hours, again passing steam through the mixture and maintaining a temperature at about 290° C., and then stopping the heating but continuing the passing of steam through until the temperature is reduced to about 220° C.

7. The process of making ester gum which consists of heating together gum theus and glycerine in a still to a temperature whereby the water and part of the turpentine are distilled off, continuing the heating and passing a non-oxidizing gas or vapor through the mixture until the remaining turpentine is distilled off and then continuing the heating until combination between the rosin content of the gum theus and glycerine is practically complete.

8. The process of making ester gum which consists of heating together gum theus and glycerine in a still to a temperature whereby the water and part of the turpentine are distilled off, continuing the heating and passing steam through the mixture until the remaining turpentine is distilled off and then continuing the heating until combination between the rosin content of the gum theus and glycerine is practically complete.

9. The process of making ester gum from gum theus in one operation which consists in heating together gum theus and glycerine so as to drive off the turpentine content of the gum theus and simultaneously to combine the rosin content of the gum theus with the glycerine.

10. The process of making ester gum from gum theus in one operation, which consists in heating together gum theus and glycerine so as to drive off the turpentine content of the gum theus and so as to simultaneously combine the rosin content of the gum theus with the glycerine, and passing steam through the mixture to facilitate the chemical action.

11. The process of making ester gum which consists in combining the rosin content of a quantity of gum theus with an esterifying agent in one heating operation.

12. The process of making rosin esters in one operation, which consists in heating together gum theus and an esterifying agent to a sufficiently high temperature to remove the water, turpentine and other light oils from the gum theus and cause the combination of the rosin content of the gum theus with the esterifying agent.

BAILEY F. WILLIAMSON.
WALTER H. BEISLER.